Dec. 30, 1930.                J. B. GIBBS                1,786,746
              TERMINAL BLOCK FOR CURRENT TRANSFORMERS
                 Filed Jan. 18, 1929        2 Sheets-Sheet 1
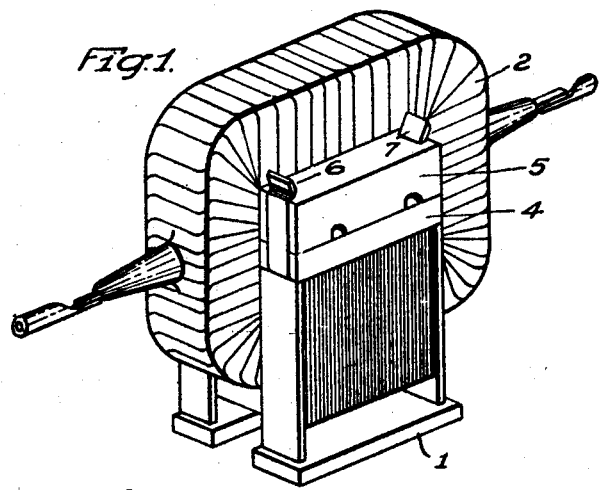
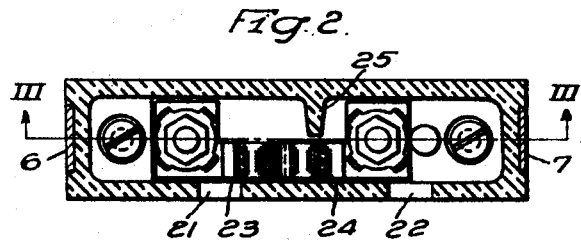
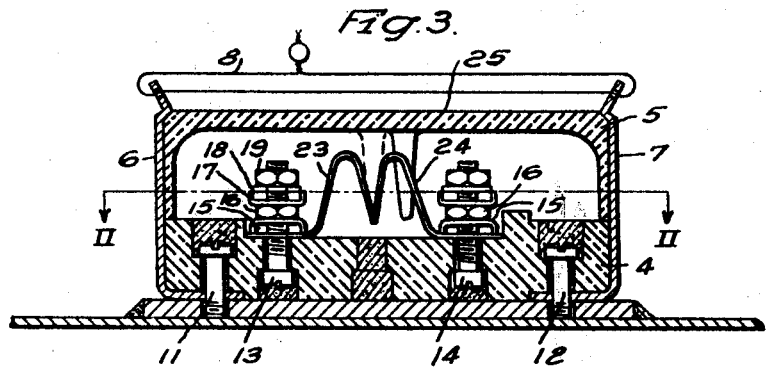
INVENTOR
*Jesse B. Gibbs.*
BY
ATTORNEY

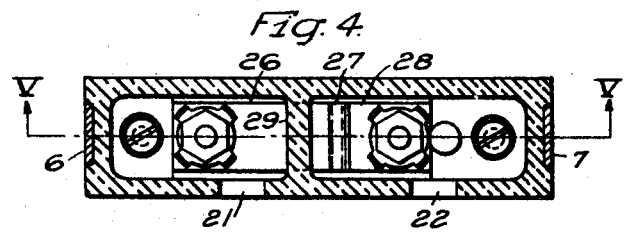
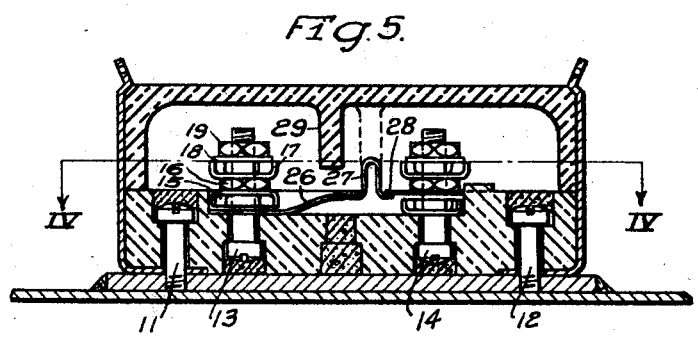
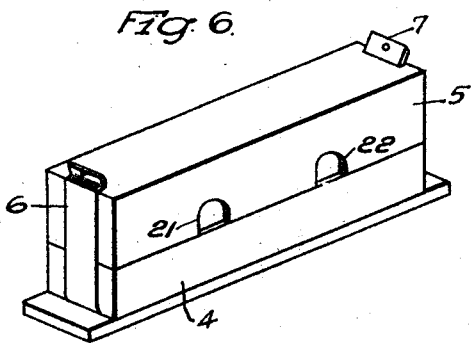
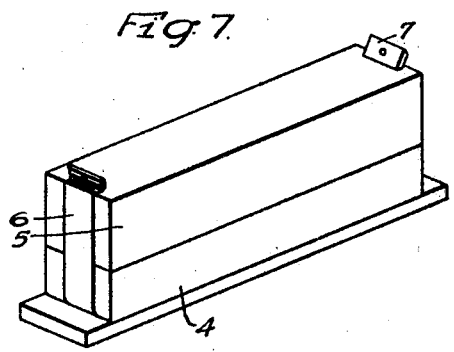

Patented Dec. 30, 1930

1,786,746

UNITED STATES PATENT OFFICE

JESSE B. GIBBS, OF SHARON, PENNSYLVANIA, ASSIGNOR TO WESTINGHOUSE ELECTRIC & MANUFACTURING COMPANY, A CORPORATION OF PENNSYLVANIA

TERMINAL BLOCK FOR CURRENT TRANSFORMERS

Application filed January 18, 1929. Serial No. 333,386.

My invention relates to current transformers, and particularly to terminal blocks therefor that are provided with means for short circuiting the secondary winding of the current transformer.

It is desirable that the secondary winding of a current transformer be maintained short circuited when it is not connected to a load circuit, since, when the secondary winding of the transformer is open-circuited, the impedance of the primary circuit may be large, and the voltage of the secondary circuit so high as to damage the insulation of the transformer or cause injury to persons connecting instruments to the secondary circuit of the transformer. It is also desirable that the short-circuit connection between the secondary terminals of the transformer be removed when a load circuit is connected to the terminals, in order that the load circuit may function properly.

My invention contemplates the provision of a terminal block for current transformers comprising a base for supporting terminals for the secondary winding thereof and a short circuiting switch, that is normally biased to a circuit-closing position, for connecting the secondary terminals of the transformer together, and with a cover for the base which may be attached to it in one of two positions, and, when attached in one of its positions, causes the switch contacts to become disengaged, while, when attached in the other position, permits the switch contact member to remain in engagement.

The cover is provided, in one side, with openings which are so positioned, relative to the secondary terminals of the transformer, as to expose them when the cover is attached to the base in a position to open the short-circuiting switch, thus permitting the load-circuit conductors to pass through the cover. When the cover is attached in a position permitting the short-circuiting switch to remain closed, the openings in the side of the cover are on the back of the terminal block, or out of view of the operator, and the side of the cover then in view completely seals the terminals. The position of the cover of the terminal block upon the base, therefore, serves as a visual indication of whether the short-circuiting switch is in its open position or in its closed position.

An object of my invention is the provision of a terminal block for current transformers having a cover which may be placed thereon in different positions and which serves as means for automatically actuating a short-circuiting switch for the secondary circuit of the transformer.

A second object of my invention is to so construct the cover of the terminal block that it may also serve as a visual indicating means for showing whether the short-circuiting switch is in its circuit-opening or circuit-closing position.

My invention will be better understood by reference to the accompanying drawings, wherein Figure 1 is a perspective view of a current transformer provided with a terminal block constructed in accordance with my invention, Fig. 2 is a transverse sectional view of one preferred form of terminal block taken along the lines II—II of Fig. 3, Fig. 3 is a vertical sectional view of the form of the embodiment of the invention shown in Fig. 2 and is taken on the line III—III of Fig. 2, Fig. 4 is a transverse sectional view of a second preferred form of the invention, taken along the line IV—IV of Fig. 5, Fig. 5 is a vertical sectional view, taken along the line V—V of Fig. 4, Fig. 6 is a perspective view of the terminal block with the cover placed thereon in a position to expose the secondary terminals of the transformer, and Fig. 7 is a perspective view of a terminal block with the cover placed thereon in a position to conceal the secondary terminals of the transformer.

Referring to the drawing, a terminal block 1 is provided in any suitable location with respect to a current transformer 2, and, as illustrated in Fig. 1 of the drawing, may be mounted on the iron laminated structure forming the magnetic circuit of the transformer. The terminal block comprises a base portion 4 and a cover portion 5 to be held tightly in place thereon by means of the spring clips 6 and 7 which may be arranged to fit into grooves in the ends of the terminal block and cover and are provided with bent end portions for gripping the top of the cover, as shown in the several figures of the drawing. The cover may be removed from the base of the terminal block by lifting it upwardly, thus causing the upper ends of the spring clips 6 and 7 to separate sufficiently to permit the cover to pass between them. In case it is desired to lock the cover member upon the base so that it will not be tampered with by unauthorized persons, a sealing wire 8 may be passed through small openings in the ends of the spring clips, as shown in Fig. 3, and fastened with a seal, thus preventing the clips from separating.

The terminal block base 4 may be attached to any suitable supporting member by bolts 11 and 12 which also serve to tightly hold the lower ends of the spring clips 6 and 7 in place. Terminal studs 13 and 14 may be provided in the base of the terminal block, and connected to the ends of the secondary conductors of the transformer, as by the nuts and set screws 15 and 16. Each stud also may be provided with nut 17, washer 18, and lock nut 19 for receiving and holding the conductors of a load circuit, such as a relay, or the current coils of indicating instruments.

The cover member is provided with two openings 21 and 22, as shown in Figs. 2, 4 and 6 of the drawing, and may be placed upon the base portion of the terminal block in either of the two positions shown in Figs. 6 and 7, respectively.

In the position shown in Fig. 6, the openings 21 and 22 are so positioned as to expose the terminal studs 13 and 14 and permit the leads of the load circuit to pass through these openings.

In the position shown in Fig. 7, the openings are positioned on the reverse side of the terminal block, next to the transformer windings, and the solid wall of the cover conceals the studs 13 and 14 from view.

The position of the cover shown in Fig. 6 of the drawing is that used when a load circuit is connected to the secondary terminals of the transformer and the short-circuiting switch is in its open-circuit position, and the position of the cover shown in Fig. 7 is that used when the load circuit is not in use, and the secondary circuit of the transformer is short circuited.

In the form of the invention shown in Figs. 2 and 3 of the drawing, a short-circuiting switch is provided comprising two wing switch blades 23 and 24. The blades are connected, respectively, to the studs 13 and 14 to normally engage each other, thus closing a circuit between the terminals 13 and 14. It will be noted by reference to the drawing, that the spring blades 23 and 24 of the switch are of such width that they occupy less than one half of the space between the side walls of the cover, and that a rib 25 is formed on one side of the cover member to extend slightly less than one half of the distance between the side walls thereof.

In the position of the cover shown in Figs. 2 and 3, the rib 25 is beside the spring blades but not in engagement therewith. If the cover is removed and the ends thereof reversed, and the cover again replaced, the rib 25, which will be on the same side of the block as the spring blades 23 and 24 and will pass between and separate them, as the cover is pushed downwardly between the spring clips 6 and 7, thus opening the short circuit between the terminals 13 and 14. This position of the rib 25 is shown in dotted lines in Fig. 3.

With the form of terminal block and short-circuiting switch illustrated in Figs. 4 and 5 of the drawing, a spring contactor or switch blade 26, having an upturned hump portion 27, is connected to one of the terminal studs 13, and is normally biased upwardly against a contactor blade 28, which is connected to the other terminal stud 14. A rib 29 is shown which, when the cover is in the position illustrated in Figs. 4 and 5, does not interfere with the engagement of the switch blades 26 and 28. When, however, the cover is removed and is replaced with the ends thereof reversed, the rib 29 will be in the position shown in dotted lines in Fig. 5 and will engage the upturned or hump portion 27 of the blade 26, thus forcing it downwardly and out of engagement with the blade 28. The block base and cover members may be made of suitable molded composition of insulating material.

It will be observed from the above description of the two embodiments of my invention that, when the terminal block cover is placed upon the base in the normal position for use, an accidental short circuit of the secondary terminals on the block, which would prevent the instruments from indicating, cannot be made, and that when the cover is removed from the base, or when it is replaced in the other of its two positions, the secondary terminals of the transformer will remain short-circuited, thus preventing injury to the transformer windings or to the operator.

Since many modifications may be made in the details of the structures disclosed to illustrate embodiments of my invention without departing from the spirit thereof, I do not wish to be limited otherwise than by the scope of the appended claims.

I claim as my invention:

1. A current-transformer terminal block comprising a base, secondary terminals and a spring-closed contact switch mounted on the base for short-circuiting said terminals, and a cover formed to be secured upon said base in either of two positions, said spring-closed contact switch being arranged to be automatically opened when said cover is positioned upon said base in one of its said two positions.

2. A current-transformer terminal block comprising a base, secondary terminals, and a spring-closed contact switch mounted on the base for short circuiting said terminals, a cover formed to be secured upon said base in either of two positions, and means attached to said cover for actuating said switch to its open-circuit position when said cover is positioned upon said base in one of its said two positions.

3. A current-transformer terminal block comprising a base, secondary terminals, and a spring-closed contact switch mounted on the base for short circuiting said terminals, and a cover formed to be secured upon said base in either of two positions, a rib on said cover so positioned with respect to said switch as to actuate the switch to a circuit-opening position when the cover is positioned upon said base in one of its said two positions but not to actuate the switch when the cover is positioned upon said base in the other of its said two positions.

4. A current-transformer terminal block comprising a base, secondary terminals and a spring-closed contact switch mounted on the base for short circuiting said terminals, and a cover formed to be secured upon said base in either of two positions, a rib on said cover so positioned with respect to said switch as to actuate the switch to a circuit-opening position when the cover is positioned upon said base in one of its said two positions but not to actuate the switch when the cover is positioned upon said base in the other of its said two positions, and visual means whereby the position of the short circuiting switch may be observed from the position of the cover member.

5. A current-transformer terminal block comprising a base, secondary terminals and a switch mounted on the base for short circuiting said terminals, said switch being normally biased to its circuit-closing position, and a cover formed to be secured upon said base in either of two positions, said cover being so shaped as to conceal said terminals in one of its positions and to expose said terminals in the other of its positions, and means for automatically actuating said switch to its circuit-opening position when the cover is secured upon said base in a position to expose said terminals.

In testimony whereof, I have hereunto subscribed my name this 9th day of January, 1929.

JESSE B. GIBBS.